(12) United States Patent
Gebauer et al.

(10) Patent No.: US 11,861,873 B2
(45) Date of Patent: *Jan. 2, 2024

(54) EVENT CAMERA-BASED GAZE TRACKING USING NEURAL NETWORKS

(71) Applicant: Apple Inc., Cupertino, CA (US)

(72) Inventors: Thomas Gebauer, Bavaria-Bayern (DE); Raffi Bedikian, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/881,692

(22) Filed: Aug. 5, 2022

(65) Prior Publication Data
US 2023/0136669 A1 May 4, 2023

Related U.S. Application Data

(63) Continuation of application No. 16/963,633, filed as application No. PCT/US2019/014755 on Jan. 23, 2019, now Pat. No. 11,442,539.

(Continued)

(51) Int. Cl.
*G06V 10/141* (2022.01)
*G06F 3/01* (2006.01)
(Continued)

(52) U.S. Cl.
CPC ............ *G06V 10/141* (2022.01); *G06F 3/013* (2013.01); *G06F 18/214* (2023.01);
(Continued)

(58) Field of Classification Search
CPC .. G06V 10/141; G06V 10/454; G06V 10/764; G06V 10/82; G06V 40/193;
(Continued)

(56) References Cited

U.S. PATENT DOCUMENTS 7,963,652 B2 6/2011 Vertegaal et al.
8,878,749 B1 11/2014 Wu et al.
(Continued)

FOREIGN PATENT DOCUMENTS

WO 2017205789 11/2017

OTHER PUBLICATIONS

European Patent Office, Examination Report (Communication Pursuant to Article 94(3) EPC), European Patent Application No. 19704510.7, 5 pages, dated Aug. 10, 2022.

(Continued)

*Primary Examiner* — Abhishek Sarma
(74) *Attorney, Agent, or Firm* — Thompson Hine LLP

(57) ABSTRACT

One implementation involves a device receiving a stream of pixel events output by an event camera. The device derives an input image by accumulating pixel events for multiple event camera pixels. The device generates a gaze characteristic using the derived input image as input to a neural network trained to determine the gaze characteristic. The neural network is configured in multiple stages. The first stage of the neural network is configured to determine an initial gaze characteristic, e.g., an initial pupil center, using reduced resolution input(s). The second stage of the neural network is configured to determine adjustments to the initial gaze characteristic using location-focused input(s), e.g., using only a small input image centered around the initial pupil center. The determinations at each stage are thus efficiently made using relatively compact neural network configurations. The device tracks a gaze of the eye based on the gaze characteristic.

20 Claims, 11 Drawing Sheets

Related U.S. Application Data

(60) Provisional application No. 62/621,093, filed on Jan. 24, 2018.

(51) Int. Cl.
    *G06T 3/40*     (2006.01)
    *G06V 40/18*    (2022.01)
    *G06F 18/214*   (2023.01)
    *G06F 18/2413*  (2023.01)
    *G06V 10/764*   (2022.01)
    *G06V 10/82*    (2022.01)
    *G06V 10/44*    (2022.01)

(52) U.S. Cl.
    CPC ........ *G06F 18/2413* (2023.01); *G06T 3/4046* (2013.01); *G06V 10/454* (2022.01); *G06V 10/764* (2022.01); *G06V 10/82* (2022.01); *G06V 40/193* (2022.01)

(58) Field of Classification Search
    CPC .... G06F 3/013; G06F 18/214; G06F 18/2413; G06T 3/4046
    See application file for complete search history.

(56) References Cited

U.S. PATENT DOCUMENTS

| | | |
|---|---|---|
| 9,672,416 B2 | 6/2017 | Zhang et al. |
| 2014/0002349 A1 | 1/2014 | Hansen |
| 2015/0098620 A1 | 4/2015 | Wu et al. |
| 2017/0131765 A1 | 5/2017 | Perek et al. |
| 2017/0188823 A1 | 7/2017 | Ganesan et al. |

OTHER PUBLICATIONS

PCT, European Patent Office (ISA/EP), International Search Report and Written Opinion of the International Searching Authority, International Application No. PCT/US2019/014755, 17 pages (dated Apr. 24, 2019).

Deng, H. and Zhu, W., "Monocular Free-head 3D Gaze Tracking with Deep Learning and Geometry Constraints," 2017 IEEE International Conference on Computer Vision, pp. 3162-3171 (Oct. 2017).

George, A. and Routray, A., "Real-time Eye Gaze Direction Classification Using Convolutional Neural Network," arxiv. org, Cornell University Library, Ithaca, NY, XP080701693, 5 pages (May 2016).

Huynh, T-H., "A New Eye Gaze Detection Algorithm Using PCA Features and Recurrent Neural Networks," 2013 IEEE Symposium on Computational Intelligence in Control and Automation, pp. 24-29 (Apr. 2013).

Krafka, K. et al., "Eye Tracking for Everyone," 2016 IEEE Conference on Computer Vision and Pattern Recognition, pp. 2176-2184 (Jun. 2016).

Kümmerer, M. et al., "Understanding Low- and High-Level Contributions to Fixation Prediction," 2017 IEEE International Conference on Computer Vision, pp. 4799-4808 (Oct. 2017).

Ngo, T., "Saccade Gaze Prediction Using a Recurrent Neural Network," 2017 IEEE International Conference on Image Processing, pp. 3435-3439 (Sep. 2017).

EVENT CAMERA-BASED GAZE TRACKING USING NEURAL NETWORKS

CROSS-REFERENCE TO RELATED APPLICATIONS

This Application is a continuation of U.S. patent application Ser. No. 16/963,633, filed Jul. 21, 2020, which claims the benefit of a 35 U.S.C. § 371, International Patent Application No. PCT/US2019/014755, filed Jan. 23, 2019, which claims the benefit of U.S. Provisional Application Ser. No. 62/621,093 filed Jan. 24, 2019, each of which is incorporated by reference herein in its entirety.

TECHNICAL FIELD

The present disclosure generally relates to gaze tracking, and in particular, to systems, methods, and devices for gaze tracking using event camera data.

BACKGROUND

Existing gaze tracking systems determine gaze direction of a user based on shutter-based camera images of the user's eye. Existing gaze tracking systems often include a camera that transmits images of the eyes of the user to a processor that performs the gaze tracking. Transmission of the images at a sufficient frame rate to enable gaze tracking requires a communication link with substantial bandwidth and using such a communication link increases heat generated and power consumption by the device.

SUMMARY

Various implementations disclosed herein include devices, systems, and methods that use neural networks for event camera-based gaze tracking. One exemplary implementation involves performing operations at a device with one or more processors and a computer-readable storage medium. The device receives a stream of pixel events output by an event camera. The event camera has pixel sensors positioned to receive light from a surface of an eye. Each respective pixel event is generated in response to a respective pixel sensor detecting a change in light intensity of the light at a respective event camera pixel that exceeds a comparator threshold. The device derives an image from the stream of pixel events by accumulating pixel events for multiple event camera pixels. The device generates a gaze characteristic using the derived image as input to a neural network. The neural network is trained to determine the gaze characteristic using a training dataset of training images that identify the gaze characteristic. The device tracks a gaze of the eye based on the gaze characteristic generated using the neural network.

Various implementations configure a neural network to efficiently determine gaze characteristics. Efficiency is achieved, for example, by using a multi-stage neural network. The first stage of the neural network is configured to determine an initial gaze characteristic, e.g., an initial pupil center, using reduced resolution input(s). The second stage of the neural network is configured to determine adjustments to the initial gaze characteristic using location-focused input(s), e.g., using only a small input image centered around the initial pupil center. The determinations at each stage are thus efficiently computed using relatively compact neural network configurations.

In some implementations, a recurrent neural network such as long/short-term memory (LSTM) or gate-recurrent-unit (GRU)-based network is used to determine gaze characteristics. Using a recurrent neural network can provide efficiency. The neural network maintains an internal state used for refining the gaze characteristic over time, as well as producing a smoother output result. During momentary ambiguous scenarios, such as occlusions due to eyelashes, the internal state is used to ensure temporal consistency of the gaze characteristic.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
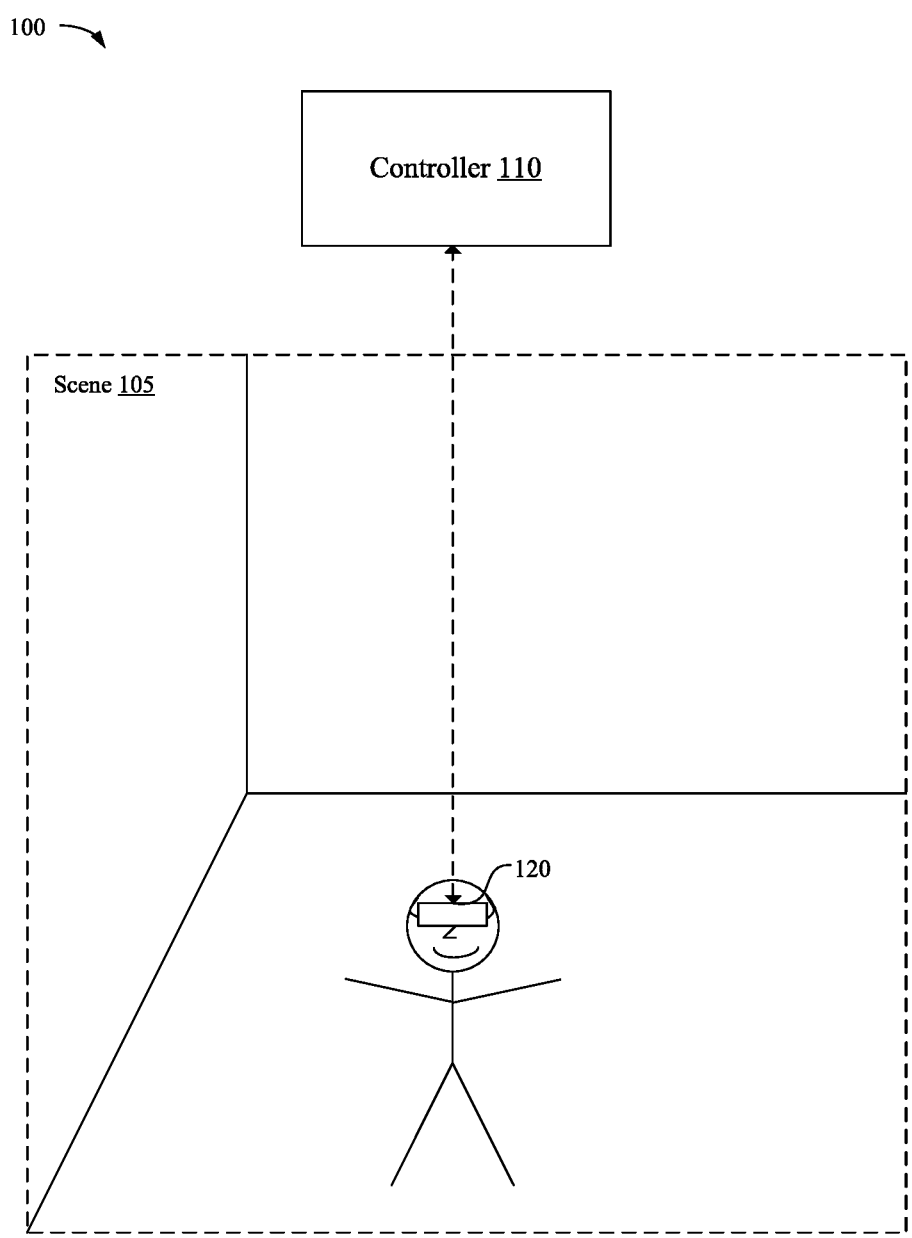
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

In various implementations, gaze tracking is used to enable user interaction, provide foveated rendering, or reduce geometric distortion. A gaze tracking system includes a camera and a processor that performs gaze tracking on data received from the camera regarding light from a light source reflected off the eye of a user. In various implementations, the camera includes an event camera with a plurality of light sensors at a plurality of respective locations that, in response to a particular light sensor detecting a change in intensity of light, generates an event message indicating a particular location of the particular light sensor. An event camera may include or be referred to as a dynamic vision sensor (DVS), a silicon retina, an event-based camera, or a frame-less camera. Thus, the event camera generates (and transmits) data regarding changes in light intensity as opposed to a larger amount of data regarding absolute intensity at each light sensor. Further, because data is generated when intensity changes, in various implementations, the light source is configured to emit light with modulating intensity.

In various implementations, the asynchronous pixel event data from one or more event cameras is accumulated to produce one or more inputs to a neural network configured to determine one or more gaze characteristics, e.g., pupil center, pupil contour, glint locations, gaze direction, etc. The accumulated event data can be accumulated over time to produce one or more input images for the neural network. A first input image can be created by accumulating event data over time to produce an intensity reconstruction image that reconstructs the intensity of the image at the various pixel locations using the event data. A second input image can be created by accumulating event data over time to produce a timestamp image that encodes the age of (e.g., time since) recent event camera events at each of the event camera pixels. A third input image can be created by accumulating glint-specific event camera data over time to produce a glint image. These input images are used individually or in combination with one another and/or other inputs to the neural network to generate the gaze characteristic(s). In other implementations, event camera data is uses as input to a neural network in other forms, e.g., individual events, events within a predetermined time window, e.g., 10 milliseconds.

In various implementations, a neural network that is used to determine gaze characteristics is configured to do so efficiently. Efficiency is achieved, for example, by using a multi-stage neural network. The first stage of the neural network is configured to determine an initial gaze characteristic, e.g., an initial pupil center, using reduced resolution inputs. For example, rather than using a 400×400 pixel input image, the resolution of the input image at the first stage can be reduced down to 50×50 pixels. The second stage of the neural network is configured to determine adjustments to the initial gaze characteristic using location-focused input, e.g., using only a small input image centered around the initial pupil center. For example, rather than using the 400×400 pixel input image, a selected portion of this input image (e.g., 80×80 pixels centered around the pupil center) at the same resolution can be used as input at the second stage. The determinations at each stage are thus made using relatively compact neural network configurations. The respective neural network configurations are relatively small and efficient due to the respective inputs (e.g., a 50×50 pixel image and an 80×80 pixel image) being smaller than the full resolution (e.g., 400×400 pixel image) of the entire image of data received from the event camera(s).

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and a head-mounted device (HMD) 120.

In some implementations, the controller 110 is configured to manage and coordinate an augmented reality/virtual reality (AR/VR) experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the scene 105. In one example, the controller 110 is a local server located within the scene 105. In another example, the controller 110 is a remote server located outside of the scene 105 (e.g., a cloud server, central server, etc.). In some implementations, the controller 110 is communicatively coupled with the HMD 120 via one or more wired or wireless communication channels 144 (e.g., BLUETOOTH, IEEE 802.11x, IEEE 802.16x, IEEE 802.3x, etc.).

In some implementations, the HMD 120 is configured to present the AR/VR experience to the user. In some implementations, the HMD 120 includes a suitable combination of software, firmware, and/or hardware. The HMD 120 is described in greater detail below with respect to FIG. 3. In some implementations, the functionalities of the controller 110 are provided by and/or combined with the HMD 120.

According to some implementations, the HMD 120 presents an augmented reality/virtual reality (AR/VR) experience to the user while the user is virtually and/or physically present within the scene 105. In some implementations, while presenting an augmented reality (AR) experience, the HMD 120 is configured to present AR content and to enable optical see-through of the scene 105. In some implementations, while presenting a virtual reality (VR) experience, the HMD 120 is configured to present VR content and to enable video pass-through of the scene 105.

In some implementations, the user wears the HMD 120 on his/her head. As such, the HMD 120 includes one or more AR/VR displays provided to display the AR/VR content. For example, the HMD 120 encloses the field-of-view of the user. In some implementations, the HMD 120 is replaced with a handheld electronic device (e.g., a smartphone or a tablet) configured to present AR/VR content to the user. In some implementations, the HMD 120 is replaced with an AR/VR chamber, enclosure, or room configured to present AR/VR content in which the user does not wear or hold the HMD 120.

Figure 2:
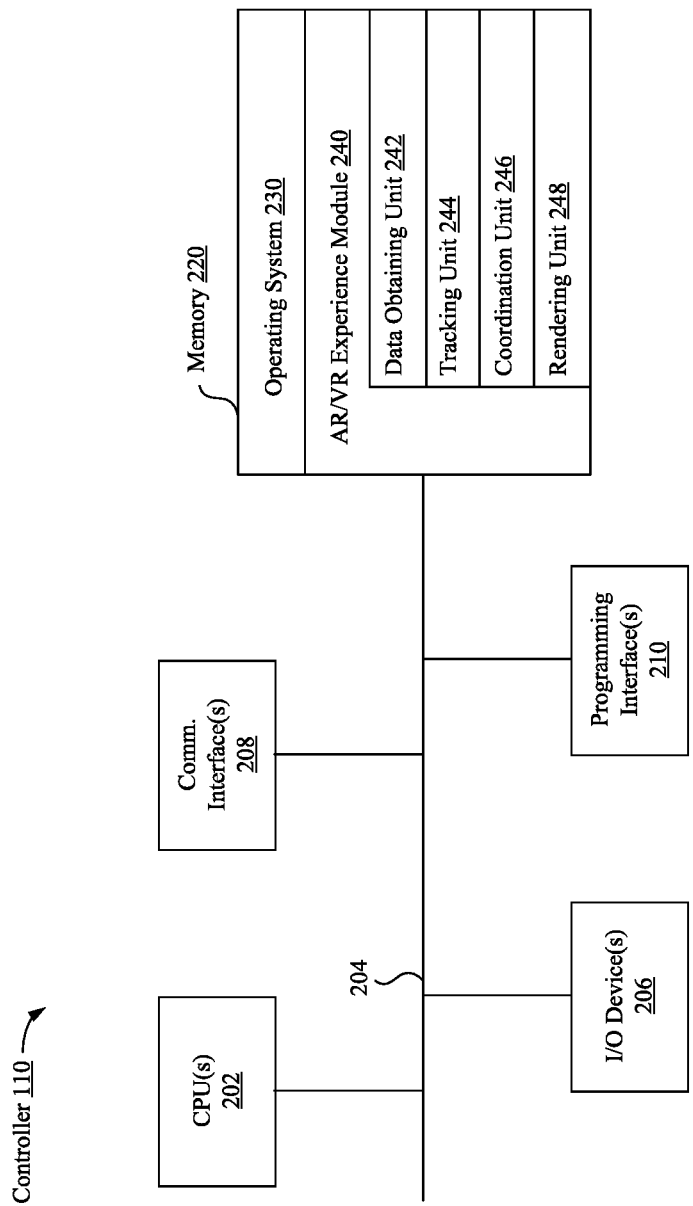
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an augmented reality/virtual reality (AR/VR) experience module 240.

The operating system 230 includes procedures for handling various basic system services and for performing hardware dependent tasks. In some implementations, the AR/VR experience module 240 is configured to manage and coordinate one or more AR/VR experiences for one or more users (e.g., a single AR/VR experience for one or more users, or multiple AR/VR experiences for respective groups of one or more users). To that end, in various implementations, the AR/VR experience module 240 includes a data obtaining unit 242, a tracking unit 244, a coordination unit 246, and a rendering unit 248.

In some implementations, the data obtaining unit 242 is configured to obtain data (e.g., presentation data, interaction data, sensor data, location data, etc.) from at least the HMD 120. To that end, in various implementations, the data obtaining unit 242 includes instructions and/or logic therefor, and heuristics and metadata therefor.

In some implementations, the tracking unit 244 is configured to map the scene 105 and to track the position/location of at least the HMD 120 with respect to the scene 105. To that end, in various implementations, the tracking unit 244 includes instructions and/or logic therefor, and heuristics and metadata therefor.

In some implementations, the coordination unit 246 is configured to manage and coordinate the AR/VR experience presented to the user by the HMD 120. To that end, in various implementations, the coordination unit 246 includes instructions and/or logic therefor, and heuristics and metadata therefor.

In some implementations, the rendering unit 248 is configured to render content for display on the HMD 120. To that end, in various implementations, the rendering unit 248 includes instructions and/or logic therefor, and heuristics and metadata therefor.

Although the data obtaining unit 242, the tracking unit 244, the coordination unit 246, and the rendering unit 248 are shown as residing on a single device (e.g., the controller 110), it should be understood that in other implementations, any combination of the data obtaining unit 242, the tracking unit 244, the coordination unit 246, and the rendering unit 248 may be located in separate computing devices.

Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
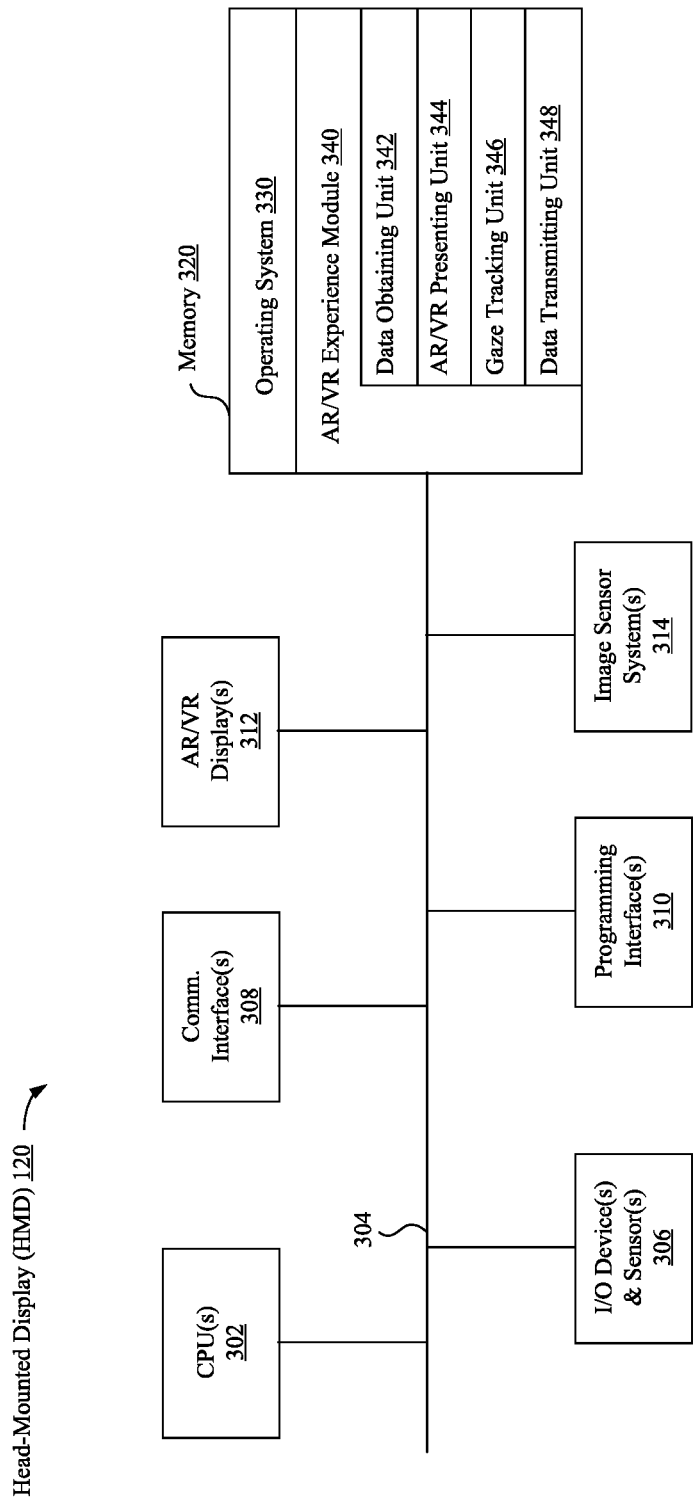
FIG. 3 is a block diagram of an example head-mounted device (HMD) in accordance with some implementations.

FIG. 3 is a block diagram of an example of the head-mounted device (HMD) 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 310, one or more AR/VR displays 312, one or more interior and/or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more AR/VR displays 312 are configured to present the AR/VR experience to the user. In some implementations, the one or more AR/VR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more AR/VR displays 312 correspond to diffractive, reflective, polarized, holographic, etc. waveguide displays. For example, the HMD 120 includes a single AR/VR display. In another example, the HMD 120 includes an AR/VR display for each eye of the user. In some implementations, the one or more AR/VR displays 312 are capable of presenting AR and VR content. In some implementations, the one or more AR/VR displays 312 are capable of presenting AR or VR content.

In some implementations, the one or more image sensor systems 314 are configured to obtain image data that corresponds to at least a portion of the face of the user that includes the eyes of the user. For example, the one or more image sensor systems 314 include one or more RGB camera (e.g., with a complimentary metal-oxide-semiconductor (CMOS) image sensor or a charge-coupled device (CCD) image sensor), monochrome camera, IR camera, event-based camera, and/or the like. In various implementations, the one or more image sensor systems 314 further include illumination sources that emit light upon the portion of the face of the user, such as a flash or a glint source.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330, an AR/VR presentation module 340, and a user data store 360.

The operating system 330 includes procedures for handling various basic system services and for performing hardware dependent tasks. In some implementations, the AR/VR presentation module 340 is configured to present AR/VR content to the user via the one or more AR/VR displays 312. To that end, in various implementations, the AR/VR presentation module 340 includes a data obtaining unit 342, an AR/VR presenting unit 344, a gaze tracking unit 346, and a data transmitting unit 348.

In some implementations, the data obtaining unit 342 is configured to obtain data (e.g., presentation data, interaction data, sensor data, location data, etc.) from at least the controller 110. To that end, in various implementations, the data obtaining unit 342 includes instructions and/or logic therefor, and heuristics and metadata therefor.

In some implementations, the AR/VR presenting unit 344 is configured to present AR/VR content via the one or more AR/VR displays 312. To that end, in various implementations, the AR/VR presenting unit 344 includes instructions and/or logic therefor, and heuristics and metadata therefor.

In some implementations, the gaze tracking unit 346 is configured to determine a gaze tracking characteristic of a user based on event messages received from an event camera. To that end, in various implementations, the gaze tracking unit 346 includes instructions and/or logic therefor, configured neural networks, and heuristics and metadata therefor.

In some implementations, the data transmitting unit 348 is configured to transmit data (e.g., presentation data, location data, etc.) to at least the controller 110. To that end, in various implementations, the data transmitting unit 348 includes instructions and/or logic therefor, and heuristics and metadata therefor.

Although the data obtaining unit 342, the AR/VR presenting unit 344, the gaze tracking unit 346, and the data transmitting unit 348 are shown as residing on a single device (e.g., the HMD 120), it should be understood that in other implementations, any combination of the data obtaining unit 342, the AR/VR presenting unit 344, the gaze tracking unit 346, and the data transmitting unit 348 may be located in separate computing devices.

Moreover, FIG. 3 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
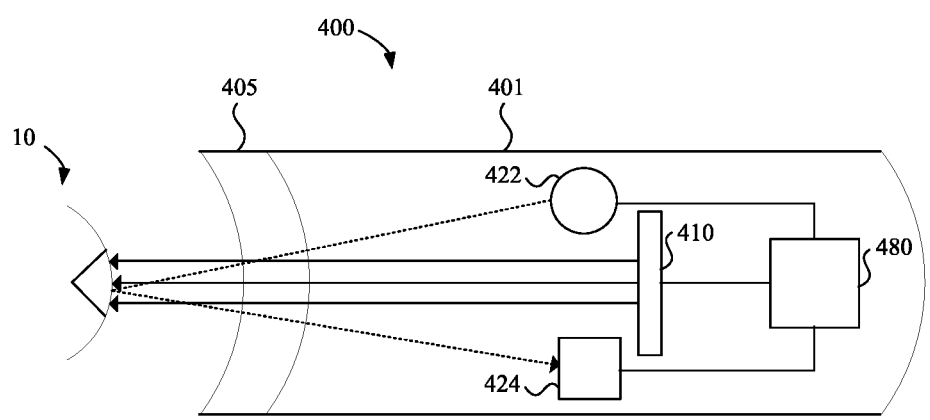
FIG. 4 is a block diagram of an example head-mounted device (HMD) in accordance with some implementations.

FIG. 4 illustrates a block diagram of a head-mounted device 400 in accordance with some implementations. The head-mounted device 400 includes a housing 401 (or enclosure) that houses various components of the head-mounted device 400. The housing 401 includes (or is coupled to) an eye pad 405 disposed at a proximal (to the user 10) end of the housing 401. In various implementations, the eye pad 405 is a plastic or rubber piece that comfortably and snugly keeps the head-mounted device 400 in the proper position on the face of the user 10 (e.g., surrounding the eye of the user 10).

The housing 401 houses a display 410 that displays an image, emitting light towards onto the eye of a user 10. In various implementations, the display 410 emits the light through an eyepiece (not shown) that refracts the light emitted by the display 410, making the display appear to the user 10 to be at a virtual distance farther than the actual distance from the eye to the display 410. For the user to be able to focus on the display 410, in various implementations, the virtual distance is at least greater than a minimum focal distance of the eye (e.g., 7 cm). Further, in order to provide a better user experience, in various implementations, the virtual distance is greater than 1 meter.

Although FIG. 4 illustrates a head-mounted device 400 including a display 410 and an eye pad 405, in various implementations, the head-mounted device 400 does not include a display 410 or includes an optical see-through display without including an eye pad 405.

The housing 401 also houses a gaze tracking system including one or more light sources 422, camera 424, and a controller 480. The one or more light sources 422 emit light onto the eye of the user 10 that reflects as a light pattern (e.g., a circle of glints) that can be detected by the camera 424. Based on the light pattern, the controller 480 can determine a gaze tracking characteristic of the user 10. For example, the controller 480 can determine a gaze direction and/or a blinking state (eyes open or eyes closed) of the user 10. As another example, the controller 480 can determine a pupil center, a pupil size, or a point of regard. Thus, in various implementations, the light is emitted by the one or more light sources 422, reflects off the eye of the user 10, and is detected by the camera 424. In various implementations, the light from the eye of the user 10 is reflected off a hot mirror or passed through an eyepiece before reaching the camera 424.

The display 410 emits light in a first wavelength range and the one or more light sources 422 emit light in a second wavelength range. Similarly, the camera 424 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, gaze tracking (or, in particular, a determined gaze direction) is used to enable user interaction (e.g., the user 10 selects an option on the display 410 by looking at it), provide foveated rendering (e.g., present a higher resolution in an area of the display 410 the user 10 is looking at and a lower resolution elsewhere on the display 410), or reduce geometric distortion (e.g., in 3D rendering of objects on the display 410).

In various implementations, the one or more light sources 422 emit light towards the eye of the user which reflects in the form of a plurality of glints.

In various implementations, the one or more light sources 422 emit light with modulating intensity towards the eye of the user. Accordingly, at a first time, a first light source of the plurality of light sources is projected onto the eye of the user with a first intensity and, at a second time, the first light source of the plurality of light sources is projected onto the eye of the user with a second intensity different than the first intensity (which may be zero, e.g., off).

A plurality of glints can result from light emitted towards the eye of a user (and reflected by the cornea) with modulating intensity. For example, at a first time, a first glint and a fifth glint of a plurality of glints are reflected by the eye with a first intensity. At a second time later than the first time, the intensity of the first glint and the fifth glint is modulated to a second intensity (e.g., zero). Also at the second time, a second glint and a sixth glint of the plurality of glints are reflected from the eye of the user with the first intensity. At a third time later than the second time, a third glint and a seventh glint of the plurality of glints are reflected by the eye of the user with the first intensity. At a fourth time later than the third time, a fourth glint and an eighth glint of the plurality of glints are reflected from the eye of the user with the first intensity. At a fifth time later than the fourth time, the intensity of the first glint and the fifth glint is modulated back to the first intensity.

Thus, in various implementations, each of the plurality of glints blinks on and off at a modulation frequency (e.g., 600 Hz). However, the phase of the second glint is offset from the phase of the first glint, the phase of the third glint is offset from the phase of the second glint, etc. The glints can be configured in this way to appear to be rotating about the cornea.

Accordingly, in various implementations, the intensity of different light sources in the plurality of light sources is modulated in different ways. Thus, when a glint, reflected by the eye and detected by the camera 424, is analyzed, the identity of the glint and the corresponding light source (e.g., which light source produced the glint that has been detected) can be determined.

In various implementations, the one or more light sources 422 are differentially modulated in various ways. In various implementations, a first light source of the plurality of light sources is modulated at a first frequency with a first phase offset (e.g., first glint) and a second light source of the plurality of light sources is modulated at the first frequency with a second phase offset (e.g., second glint).

In various implementations, the one or more light sources 422 modulate the intensity of emitted light with different modulation frequencies. For example, in various implementations, a first light source of the plurality of light sources is modulated at a first frequency (e.g., 600 Hz) and a second light source of the plurality of light sources is modulated at a second frequency (e.g., 500 Hz).

In various implementations, the one or more light sources 422 modulate the intensity of emitted light according to different orthogonal codes, such as those which may be used in CDMA (code-divisional multiplex access) communications. For example, the rows or columns of a Walsh matrix can be used as the orthogonal codes. Accordingly, in various implementations, a first light source of the plurality of light sources is modulated according to a first orthogonal code and a second light source of the plurality of light sources is modulated according to a second orthogonal code.

In various implementations, the one or more light sources 422 modulate the intensity of emitted light between a high intensity value and a low intensity value. Thus, at various times, the intensity of the light emitted by the light source is either the high intensity value or the low intensity value. In various implementation, the low intensity value is zero. Thus, in various implementations, the one or more light sources 422 modulate the intensity of emitted light between an on state (at the high intensity value) and an off state (at the low intensity value). In various implementations, the number of light sources of the plurality of light sources in the on state is constant.

In various implementations, the one or more light sources 422 modulate the intensity of emitted light within an intensity range (e.g., between 10% maximum intensity and 40% maximum intensity). Thus, at various times, the intensity of the light source is either a low intensity value, a high intensity value, or some value in between. In various implementations, the one or more light sources 422 are differentially modulated such that a first light source of the plurality of light sources is modulated within a first intensity range and a second light source of the plurality of light sources is modulated within a second intensity range different than the first intensity range.

In various implementations, the one or more light sources 422 modulate the intensity of emitted light according to a gaze direction. For example, if a user is gazing in a direction in which a particular light source would be reflected by the pupil, the one or more light sources 422 changes the intensity of the emitted light based on this knowledge. In various implementations, the one or more light sources 422 decrease the intensity of the emitted light to decrease the amount of near-infrared light from entering the pupil as a safety precaution.

In various implementations, the one or more light sources 422 modulate the intensity of emitted light according to user biometrics. For example, if the user is blinking more than normal, has an elevated heart rate, or is registered as a child, the one or more light sources 422 decreases the intensity of the emitted light (or the total intensity of all light emitted by the plurality of light sources) to reduce stress upon the eye. As another example, the one or more light sources 422 modulate the intensity of emitted light based on an eye color of the user, as spectral reflectivity may differ for blue eyes as compared to brown eyes.

In various implementations, the one or more light sources 422 modulate the intensity of emitted light according to a presented user interface (e.g., what is displayed on the display 410). For example, if the display 410 is unusually bright (e.g., a video of an explosion is being displayed), the one or more light sources 422 increase the intensity of the emitted light to compensate for potential interference from the display 410.

In various implementations, the camera 424 is a frame/shutter-based camera that, at a particular point in time or multiple points in time at a frame rate, generates an image of the eye of the user 10. Each image includes a matrix of pixel values corresponding to pixels of the image which correspond to locations of a matrix of light sensors of the camera.

In various implementations, the camera 424 is an event camera comprising a plurality of light sensors (e.g., a matrix of light sensors) at a plurality of respective locations that, in response to a particular light sensor detecting a change in intensity of light, generates an event message indicating a particular location of the particular light sensor.

Figure 5:
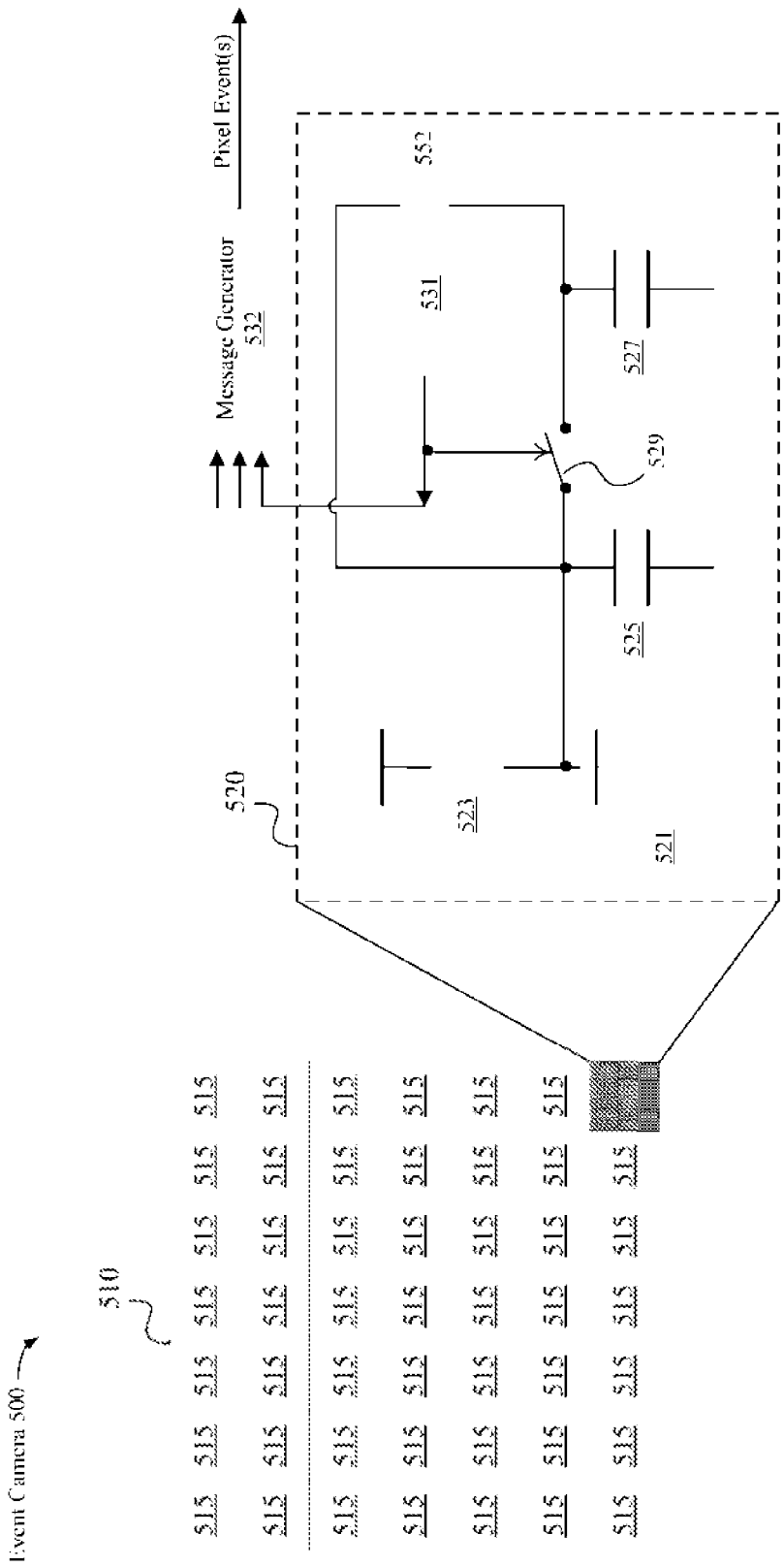
FIG. 5 illustrates a block diagram of an event camera in accordance with some implementations.

FIG. 5 illustrates a functional block diagram of an event camera 500 in accordance with some implementations. The event camera 500 includes a plurality of light sensors 515 respectively coupled to a message generator 532. In various implementations, the plurality of light sensors 515 are arranged in a matrix 510 of rows and columns and, thus, each of the plurality of light sensors 515 is associated with a row value and a column value.

Each of the plurality of light sensors 515 includes a light sensor 520 illustrated in detail in FIG. 5. The light sensor 520 includes a photodiode 521 in series with a resistor 523 between a source voltage and a ground voltage. The voltage across the photodiode 521 is proportional to the intensity of light impinging on the light sensor 520. The light sensor 520 includes a first capacitor 525 in parallel with the photodiode 521. Accordingly, the voltage across the first capacitor 525 is the same as the voltage across the photodiode 521 (e.g., proportional to the intensity of light detected by the light sensor 520).

The light sensor 520 includes a switch 529 coupled between the first capacitor 525 and a second capacitor 527. The second capacitor 527 is coupled between the switch and the ground voltage. Accordingly, when the switch 529 is closed, the voltage across the second capacitor 527 is the same as the voltage across the first capacitor 525 (e.g., proportional to the intensity of light detected by the light sensor 520). When the switch 529 is open, the voltage across the second capacitor 527 is fixed at the voltage across the second capacitor 527 when the switch 529 was last closed.

The voltage across the first capacitor 525 and the voltage across the second capacitor 527 are fed to a comparator 531. When the difference 552 between the voltage across the first capacitor 525 and the voltage across the second capacitor 527 is less than a threshold amount, the comparator 531 outputs a '0' voltage. When the voltage across the first capacitor 525 is higher than the voltage across the second capacitor 527 by at least the threshold amount, the comparator 531 outputs a '1' voltage. When the voltage across the first capacitor 525 is less than the voltage across the second capacitor 527 by at least the threshold amount, the comparator 531 outputs a '−1' voltage.

When the comparator 531 outputs a '1' voltage or a '−1' voltage, the switch 529 is closed and the message generator 532 receives this digital signal and generates a pixel event message.

As an example, at a first time, the intensity of light impinging on the light sensor 520 is a first light value. Accordingly, the voltage across the photodiode 521 is a first voltage value. Likewise, the voltage across the first capacitor 525 is the first voltage value. For this example, the voltage across the second capacitor 527 is also the first voltage value. Accordingly, the comparator 531 outputs a '0' voltage, the switch 529 remains closed, and the message generator 532 does nothing.

At a second time, the intensity of light impinging on the light sensor 520 increases to a second light value. Accordingly, the voltage across the photodiode 521 is a second voltage value (higher than the first voltage value). Likewise, the voltage across the first capacitor 525 is the second voltage value. Because the switch 529 is open, the voltage across the second capacitor 527 is still the first voltage value. Assuming that the second voltage value is at least the threshold value greater than the first voltage value, the comparator 531 outputs a '1' voltage, closing the switch 529, and the message generator 532 generates an event message based on the received digital signal.

With the switch 529 closed by the '1' voltage from the comparator 531, the voltage across the second capacitor 527 is changed from the first voltage value to the second voltage value. Thus, the comparator 531 outputs a '0' voltage, opening the switch 529.

At a third time, the intensity of light impinging on the light sensor 520 increases (again) to a third light value. Accordingly, the voltage across the photodiode 521 is a third voltage value (higher than the second voltage value). Likewise, the voltage across the first capacitor 525 is the third voltage value. Because the switch 529 is open, the voltage across the second capacitor 527 is still the second voltage value. Assuming that the third voltage value is at least the threshold value greater than the second voltage value, the comparator 531 outputs a '1' voltage, closing the switch 529, and the message generator 532 generates an event message based on the received digital signal.

With the switch 529 closed by the '1' voltage from the comparator 531, the voltage across the second capacitor 527 is changed from the second voltage value to the third voltage value. Thus, the comparator 531 outputs a '0' voltage, opening the switch 529.

At a fourth time, the intensity of light impinging on the light sensor 520 decreases back to second light value. Accordingly, the voltage across the photodiode 521 is the second voltage value (less than the third voltage value). Likewise, the voltage across the first capacitor 525 is the second voltage value. Because the switch 529 is open, the voltage across the second capacitor 527 is still the third voltage value. Thus, the comparator 531 outputs a '−1' voltage, closing the switch 529, and the message generator 532 generates an event message based on the received digital signal.

With the switch 529 closed by the '−1' voltage from the comparator 531, the voltage across the second capacitor 527 is changed from the third voltage value to the second voltage value. Thus, the comparator 531 outputs a '0' voltage, opening the switch 529.

The message generator 532 receives, at various times, digital signals from each of the plurality of light sensors 510 indicating an increase in the intensity of light ('1' voltage) or a decrease in the intensity of light ('−1' voltage). In response to receiving a digital signal from a particular light sensor of the plurality of light sensors 510, the message generator 532 generates a pixel event message.

In various implementations, each pixel event message indicates, in a location field, the particular location of the particular light sensor. In various implementations, the event message indicates the particular location with a pixel coordinate, such as a row value (e.g., in a row field) and a column value (e.g., in a column field). In various implementations, the event message further indicates, in a polarity field, the polarity of the change in intensity of light. For example, the event message may include a '1' in the polarity field to indicate an increase in the intensity of light and a '0' in the polarity field to indicate a decrease in the intensity of light. In various implementations, the event message further indicates, in a time field, a time the change in intensity in light was detected (e.g., a time the digital signal was received). In various implementations, the event message indicates, in an absolute intensity field (not shown), as an alternative to or in addition to the polarity, a value indicative of the intensity of detected light.

Figure 6:
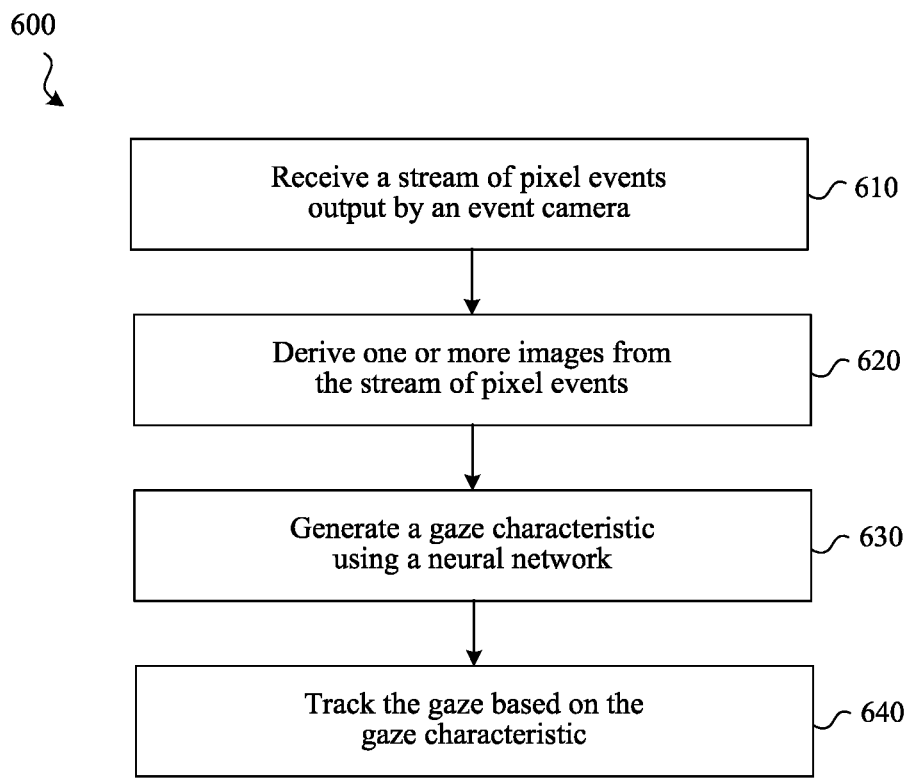
FIG. 6 is a flowchart representation of a method of event camera-based gaze tracking in accordance with some implementations.

FIG. 6 is a flowchart representation of a method 60 of event camera-based gaze tracking in accordance with some implementations. In some implementations, the method 600 is performed by a device (e.g., controller 110 of FIGS. 1 and 2), such as a mobile device, desktop, laptop, or server device. The method 600 can be performed on a device (e.g., HMD 120 of FIGS. 1 and 3) that has a screen for displaying 2D images and/or a screen for viewing stereoscopic images such as virtual reality (VR) display (e.g., a head-mounted display (HMD)) or an augmented reality (AR) display. In some implementations, the method 600 is performed by processing logic, including hardware, firmware, software, or a combination thereof In some implementations, the method 600 is performed by a processor executing code stored in a non-transitory computer-readable medium (e.g., a memory).

At block 610, the method 600 receives a stream of pixel events output by an event camera. The pixel event data can be in various forms. The stream of pixel events can be receives as a series of messages identifying pixel events at one or more pixels of the event camera. In various implementations, pixel event messages are received that each include a location field for the particular location of a particular light sensor, a polarity field, a time field, and/or an absolute intensity field.

At block 620, the method 600 derives one or more images from the stream of pixel events. The one or more images are derived to provide a combined input for a neural network. In alternative implementations, pixel event data is fed directly into a neural network as individual input items (e.g., one input per event), batches of inputs (e.g., 10 events per input), or otherwise adjusted into an appropriate form for input into the neural network.

In the implementations in which input images are derived, the information in an input image represents event camera data at a corresponding location in the event camera grid (e.g., grid 510 of FIG. 5). Thus, a value for a pixel in an upper right corner of the input image corresponds to event camera data for an upper right event camera sensor in the event camera's pixel grid. Pixel event data for multiple events is accumulated and used to produce an image that compiles event data for multiple pixels. In one example, an input image is created that represents pixel events occurring within a particular time window, e.g., over the last 10 ms. In another example, an input image is created that represents pixel events occurring up to a particular point in time, e.g., identifying a most recent pixel event to occur at each pixel. In another example, pixel events are accumulated over time to track or estimate an absolute intensity value for each pixel.

The location field associated with pixel events included in the stream of pixel events can be used to identify the location of corresponding event camera pixel. For example, pixel event data in the stream of pixel events may identify a pixel event occurring in the upper right corner pixel and this information can be used to assign a value in the input image's corresponding upper right pixel. Examples of deriving input images such as intensity reconstruction images, timestamp images, and glint images are described herein with respect to FIG. 7.

At block 630, the method 600 generates a gaze characteristic using a neural network. The one or more input images that are derived from the event camera stream of pixel events are used as input to the neural network. The neural network is trained to determine the gaze characteristic using a training dataset of training images that identify the gaze characteristic. For example, a training set can be created using shutter-based images or event camera-derived images of the eyes of a number of subjects (e.g., 25 subjects, 50 subjects, 100 subjects, 1,000 subjects, 10,000 subjects, etc.). The training data set can include a number of images of the eyes of each subject (e.g., 25 images, 50 images, 100 images, 1,000 images, 10,000 images, etc.). The training data can include ground truth gaze characteristic identifications, e.g., location or direction information identifying the locations of pupil centers, the contour shapes of pupils, pupil dilation, glint locations, gaze directions, etc. For pupil contour shape, a neural network can be trained with data indicating a set of points around the perimeter of the pupil, e.g., five points that are sampled in a repeatable fashion around the pupil and fit with an ellipse. The training data can additionally or alternatively be labelled with emotional characteristics (e.g., "interested" as indicated by relatively larger pupil size and "disinterested" as indicated by relatively smaller pupil size). The ground truth data can be manually identified, semi-automatically determined, or automatically determined. The neural network can be configured to use event camera data, shutter-based camera data, or a combination of the two types of data. The neural network can be configured to be indifferent as to whether the data is coming from a shutter-based camera or an event camera.

At block 640, the method 600 tracks the gaze based on the gaze characteristics. In some implementations, the gaze is tracked based on the pupil center location, the glint locations, or a combination of these features. In some implementations, the gaze is tracked by tracking pupil center and glint locations to determine and update a geometric model of the eye that is then used to reconstruct gaze direction. In some implementations, gaze is tracked by comparing current gaze characteristics with prior gaze characteristics. For example, gaze can be tracked using an algorithm to compare the pupil center position as it changes over time.

In some implementations, the gaze is tracked based on additional information. For example, a correspondence between a selection of a UI item displayed on a screen of a HMD and a pupil center location can be determined when the user selects the UI item. This assumes that the user is looking at the UI item as he or she selects it. Based on the location of the UI element on the display, the location of the display relative to the user, and the current pupil location, the gaze direction associated with the direction from the eye to the UI element can be determined. Such information can be used to adjust or calibrate gaze tracking performed based on the event camera data.

In some implementations, tracking the gaze of the eye involves updating the gaze characteristic in real time as subsequent pixel events in the event stream are received. The pixel events are used to derive additional images and the additional images are used as input to the neural network to generate updated gaze characteristics. The gaze characteristic can be used for numerous purposes. In one example, the gaze characteristic that is determined or updated is used to identify an item displayed on a display, e.g., to identify what button, image, text, or other user interface item a user is looking at. In another example, the gaze characteristic that is determined or updated is used to display a movement of a graphical indicator (e.g., a cursor or other user controlled icon) on a display. In another example, the gaze characteristic that is determined or updated is used to select an item (e.g., via a cursor selection command) displayed on a display. For example, a particular gaze movement pattern can be recognized and interpreted as a particular command.

Event camera-based gaze tracking techniques, such as the method 600 illustrated in FIG. 6, provide numerous advantages over techniques that rely solely on shutter-based camera data. Event cameras may capture data at a very high sample rate and thus allow the creation of image input images at a faster rate than using a shutter-based camera. The input images (e.g., the intensity reconstruction images) that are created can emulate data from an extremely fast shutter-based camera without the high energy and data requirements of such a camera. The event camera produces relatively sparse data since it does not collect/send an entire frame for every event. However, the sparse data is accumulated over time to provide dense input images that are used as inputs in the gaze characteristic determinations. The result is faster gaze tracking enabled using less data and computing resources.

Figure 7:
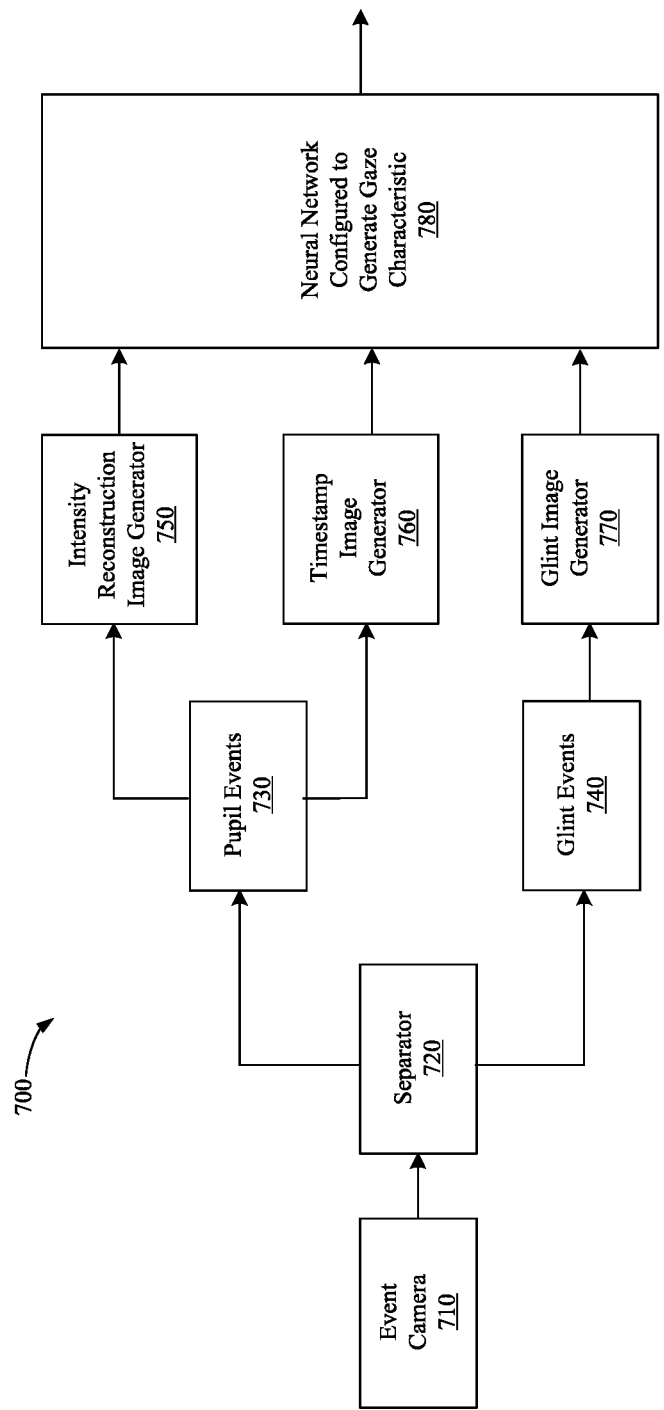
FIG. 7 illustrates a functional block diagram illustrating an event camera-based gaze tracking process in accordance with some implementations.

FIG. 7 illustrates a functional block diagram illustrating an event camera-based gaze tracking process 700 in accordance with some implementations. The gaze tracking process 700 outputs a gaze direction of a user based on event messages received from the event camera 710.

The event camera 710 comprises a plurality of light sensors at a plurality of respective locations. In response to a particular light sensor detecting a change in intensity of light, the event camera 710 generates an event message indicating a particular location of the particular light sensor. As describe above with respect to FIG. 6, in various implementations, the particular location is indicated by a pixel coordinate. In various implementations, the event message further indicates a polarity of the change in intensity of light. In various implementations, the event message further indicates a time at which the change in intensity of light was detected. In various implementations, the event message further indicates a value indicative of the intensity of detected light.

The event messages from the event camera 710 are received by a separator 720. The separator 720 separates the event message into target-frequency event messages (associated with a frequency band centered around a frequency of modulation of one or more light sources) and off-target-frequency event messages (associated with other frequencies). The off-target-frequency event messages are pupil events 730 and are fed to an intensity reconstruction image generator 750 and a timestamp image generator 760. The target-frequency event messages are glint events 740 and are fed to a glint image generator 770. In various implementations, the separator 720 determines that an event message is a target-frequency event message (or an off-target frequency event message) based on a timestamp, in a time field, indicating a time at which the change in intensity of light was detected. For example, in various implementations, the separator 720 determines that an event message is a target-frequency event message if it is one of a set including number of event messages within a set range indicating a particular location within a set amount of time. Otherwise, the separator 720 determines that the event message is an off-target-frequency event message. In various implementations, the set range and/or the set amount of time are proportional to a modulation frequency of modulated light emitted towards the eye of the user. As another example, in various implementations, the separator 720 determines that an event message is a target-frequency event message if the time between successive events with similar or opposite polarity is within a set range of times.

The intensity reconstruction image generator 750 accumulates pupil events 730 for the pupil over time to reconstruct/estimate absolute intensity values for each pupil. As additional pupil events 730 are accumulated the intensity reconstruction image generator 750 changes the corresponding values in the reconstruction image. In this way, it generates and maintains an updated image of values for all pixels of an image even though only some of the pixels may have received events recently. The intensity reconstruction image generator 750 can adjust pixel values based on additional information, e.g., information about nearby pixels, to improve the clarity, smoothness, or other aspect of the reconstructed image.

In various implementations, the intensity reconstruction image includes an image having a plurality of pixel values at a respective plurality of pixels corresponding to the respective locations of the light sensors. Upon receiving an event message indicating a particular location and a positive polarity (indicating that the intensity of light has increased), an amount (e.g., 1) is added to the pixel value at the pixel corresponding to the particular location. Similarly, upon receiving an event message indicating a particular location and a negative polarity (indicating that the intensity of light has decreased), the amount is subtracted from the pixel value at the pixel corresponding to the particular location. In various implementations, the intensity reconstruction image is filtered, e.g., blurred.

The time stamp image generator 760 encodes information about the timing of events. In one example, time stamp image generator 760 creates an image with values that represent a length of time since a respective pixel event was received for each pixel. In such an image, pixels having more recent events can have higher intensity values than pixels having less recent events. In one implementation, the timestamp image is a positive timestamp image having a plurality of pixel values indicating when the corresponding light sensors triggered the last corresponding events with positive polarity. In one implementation, the timestamp image is a negative timestamp image having a plurality of pixel values indicating when the corresponding light sensor triggered the last corresponding events with negative polarity.

The glint image generator 770 determines events that are associated with particular glints. In one example, the glint image generator 770 identifies a glint based on the associated frequency. In some implementations, glint image generator 770 accumulates glint events 740 for a period of time and produces a glint image identifying the locations of all of the glint event receives within that time period, e.g., within the last 10 ms, etc. In some implementations, the glint image generator 770 modulates the intensity of each pixel depending on how well the glint frequency or time since last event at that pixel matches an expected value (derived from the target frequency), e.g. by evaluating a Gaussian function with given standard deviation centered at the expected value.

The intensity reconstruction image generator 750, the timestamp image generator 760, and the glint image generator 770 provide images that are input to the neural network 780, which is configured to generate the gaze characteristic. In various implementations, the neural network 780 involves a convolutional neural network, a recurrent neural network, and/or a long/short-term memory (LSTM) network.

Figure 8:
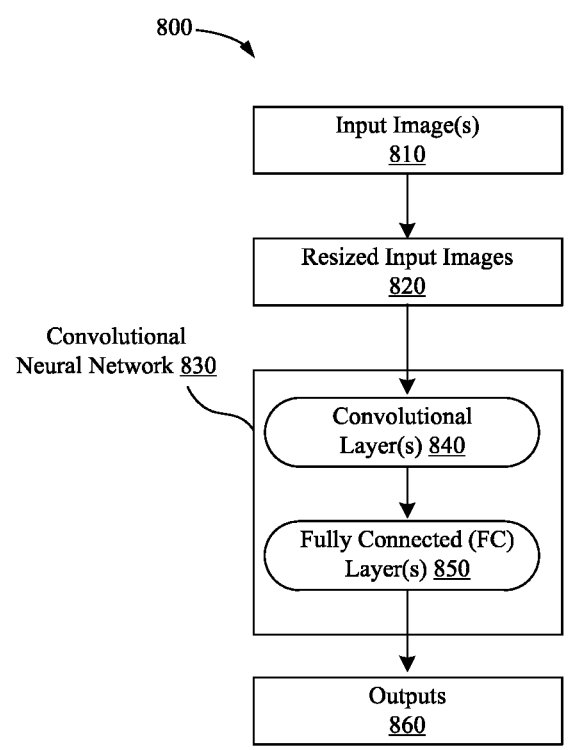
FIG. 8 illustrates a functional block diagram illustrating a system using a convolutional neural network for gaze tracking in accordance with some implementations.

FIG. 8 illustrates a functional block diagram illustrating a system 800 using a convolutional neural network 830 for gaze tracking in accordance with some implementations. The system 800 uses input image(s) 810 such as an intensity reconstruction image, a timestamp image, and/or a glint image as discussed above with respect to FIG. 7. The input image(s) 810 are resized to resized input image(s) 820. Resizing the input image(s) 810 can include down-sampling to reduce the resolution of the images and/or cropping portions of the images. The resized input image(s) 820 are input to the convolutional neural network 830. The convolutional neural network 830 includes one or more convolutional layer(s) 840 and one or more fully connected layer(s) 850 and produces outputs 860. The convolutional layer(s) 840 are configured to apply a convolution operation to their respective inputs and pass their results to the next layer. Each convolution neuron in each of the convolution layer(s) 840 can be configured to process data for a receptive field, e.g., a portion of the resized input image(s) 820. The fully connected layer(s) 850 connect every neuron of one layer to every neuron of another layer.

Figure 9:
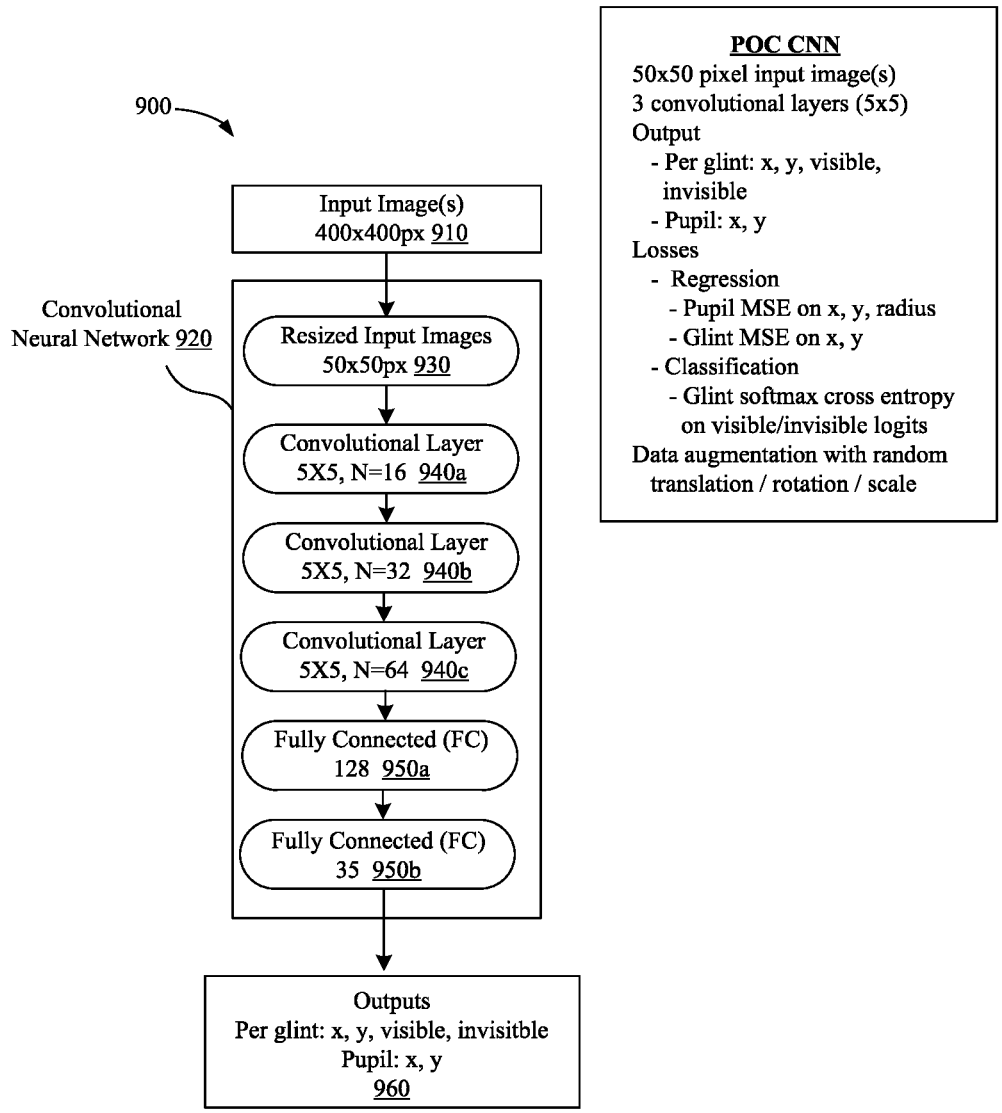
FIG. 9 illustrates a functional block diagram illustrating a system using a convolutional neural network for gaze tracking in accordance with some implementations.

FIG. 9 illustrates a functional block diagram illustrating a system 900 using a convolutional neural network 920 for gaze tracking in accordance with some implementations. The system 900 uses input image(s) 910 such as an intensity reconstruction image, a timestamp image, and/or a glint image as discussed above with respect to FIG. 7. The input image(s) 910 are resized to resized input image(s) 930. In this example, 400×400 pixel input image(s) 910 are resized to 50×50 pixel resized input image(s) 930 by down-sampling. The resized input image(s) 930 are input to the convolutional neural network 920. The convolutional neural network 920 includes three 5×5 convolutional layers 940a, 940b, 940c and two fully connected layers 950a, 950b. The convolutional neural network 920 is configured to produce output 960 identifying a pupil center x coordinate and y coordinate. The output 960 also includes, for each glint, x coordinate, y coordinate, and visible/invisible indications.

The convolutional neural network 920 includes a regression for pupil performance (e.g., mean-squared error (MSE)) on x coordinate, y coordinate, and radius and a regression for glint performance (e.g., MSE) on x coordinate and y coordinate. The convolutional neural network 920 also includes a classification for glint visibility/invisibility (e.g., glint softmax cross entropy on visible/invisible logits). The data used by the convolutional neural network 920 (during training) can be augmented with random translation, rotation, and/or scale.

Figure 10:
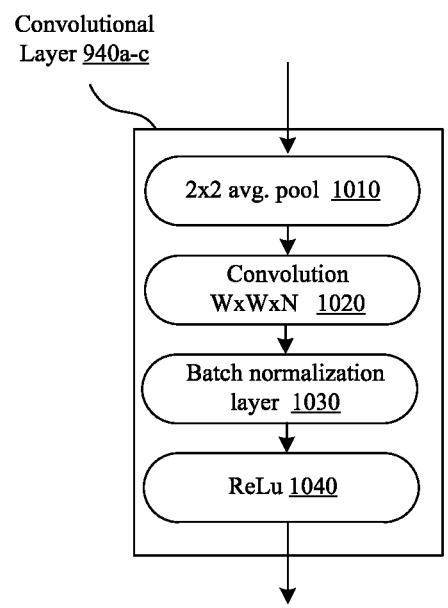
FIG. 10 illustrates a functional block diagram illustrating a convolutional layer of the convolutional neural network of FIG. 9.

FIG. 10 illustrates a functional block diagram illustrating a convolutional layer 940a-c of the convolutional neural network of FIG. 9. The convolutional layer 940a-c includes a 2×2 average pool 1010, a convolution W×W×N 1020, a batch normalization layer 1030, and a rectified linear unit (ReLu) 1040.

Figure 11:
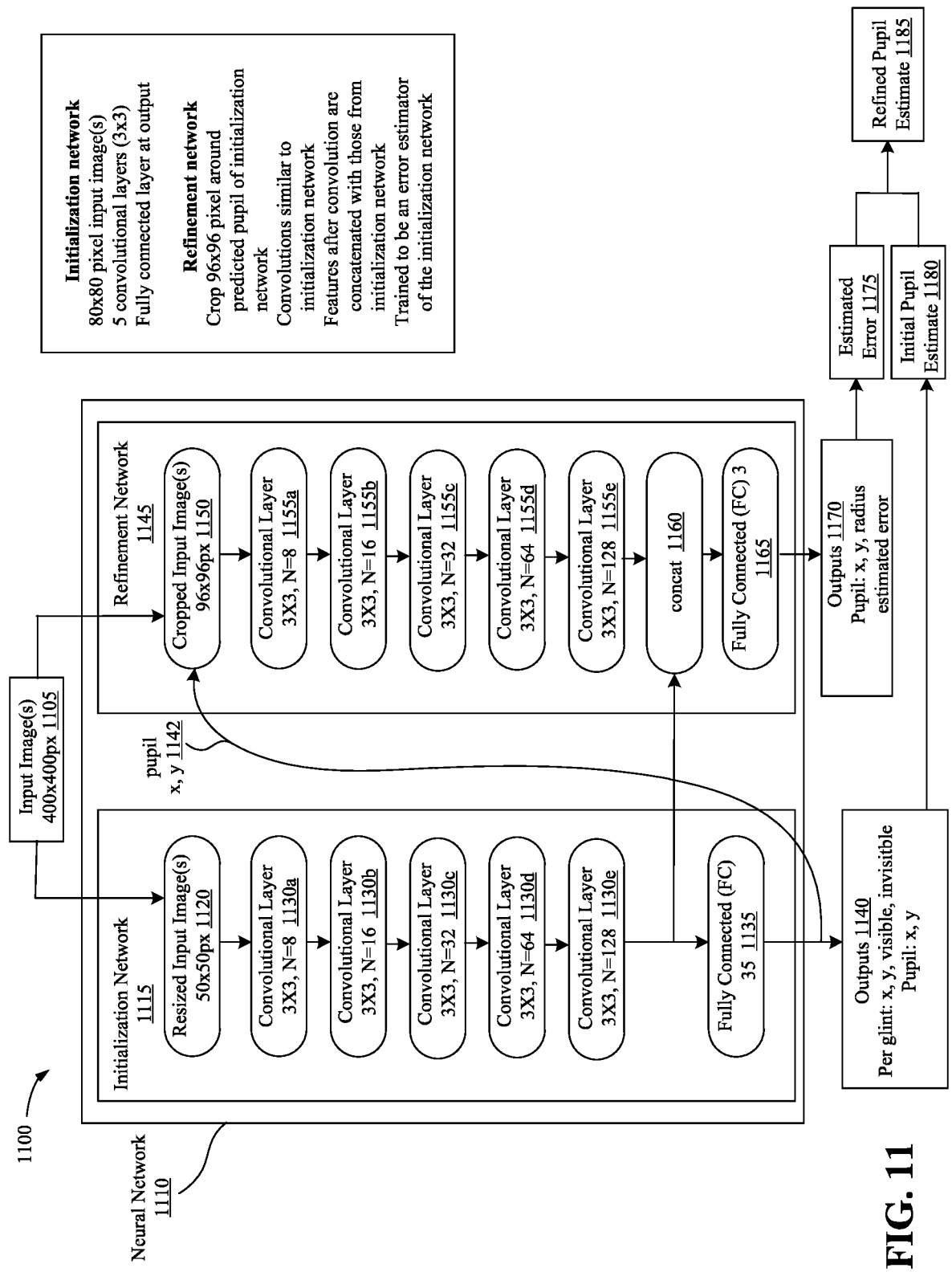
FIG. 11 illustrates a functional block diagram illustrating a system using an initialization network and a refinement network for gaze tracking in accordance with some implementations.

FIG. 11 illustrates a functional block diagram illustrating a system 1100 using an initialization network 1115 and a refinement network 1145 for gaze tracking in accordance with some implementations. The use of two sub-networks or stages can enhance the efficiency of the overall neural network 1110. The initialization network 1115 processes a low resolution image of the input image 1105 and thus does not need to have as many convolutions as it otherwise would. The pupil location that is output from the initialization network 1115 is used to make a crop of the original input image 1105 that is input to the refinement network 1145. The refinement network 1145 thus also does not need to use the entire input image 1105 and can accordingly include fewer convolutions than it otherwise would. The refinement network 1145, however, refines the location of the pupil to a more accurate location. Together, the initialization network 1105 and refinement network 1145 produce a pupil location result more efficiently and more accurately than if a single neural network were used.

The initialization network 1115 receives input image(s) 1105, which are 400×400 pixels in this example. The input image(s) 1105 are resized to resized input image(s) 1120 (which are 50×50 pixels in this example). The initialization network 1115 includes five 3×3 convolutional layers 1130a, 1130b, 1130c, 1130d, 1130e and a fully connected layer 1135 at output. The initialization network 1115 is configured to produce output 1140 identifying a pupil center x coordinate and y coordinate. The output 1140 also includes, for each glint, x coordinate, y coordinate, and visible/invisible indications.

The pupil x, y 1142 are input to the refinement network 1145 along with the input image(s) 1105. The pupil x, y 1142 is used to make a 96×96 pixel crop around pupil location at full resolution, i.e., with no down-sampling, to produce cropped input image(s) 1150. The refinement network 1145 includes five 3×3 convolutional layers 1155a, 1155b, 1155c, 1155d, 1155e, a concat layer 1160, and a fully connected layer 1165 at output. The concat layer 1160 concatenates features after the convolutions with features from the initialization network 1115. In some implementations, the features from the initialization network 1115 encode global information (e.g. eye geometry/layout/eye lid position etc) and the features from the refinement network 1145 encode local state only, i.e. what can be derived from the cropped image. By concatenating the features from the initialization network 1115 and refinement network 1145 the final fully-connected layer(s) in the refinement network 1145 can combine both global and local information and thereby generate a better estimate of the error as would be possible with local information only.

The refinement network 1145 is configured to produce output 1165 identifying estimated error 1175 that can be used to determine a pupil center x coordinate and y coordinate.

The refinement network 1145 thus acts as an error estimator of the initialization network 1115 and produces estimated error 1175. This estimated error 1175 is used to adjust the initial pupil estimate 1180 from the initialization network 1115 to produce a refined pupil estimate 1185. For example, the initial pupil estimate 1180 may identify a pupil center at x, y: 10, 10 and the estimated error 1175 from the refinement network 1145 may indicate that the x of pupil center should be 2 greater, resulting in a refined pupil estimate of x, y: 12, 10.

In some implementations, the neural network 1110 is trained to avoid overfitting by introducing random noise. In the training phase, random noise e.g., normal distributed noise with zero mean and small sigma, is added. In some implementations, the random noise is added to the initial pupil location estimate. Without such random noise, the refinement network 1145 could otherwise learn to be too optimistic. To avoid this, the initialization network 1115 output is artificially made worse during training by adding the random noise to simulate the situation where the initialization network 1115 is facing data that it has not seen before.

In some implementations, a stateful machine learning/neural network architecture is used. For example, the neural network that is used could be a LSTM or other recurrent network. In such implementations, the event data that is used as input may be provided as a labeled stream of sequential events. In some implementations, a recurrent neural network is configured to remember prior events and learn dynamic motions of the eye based on the history of events. Such a stateful architecture could learn which eye motions are naturally (e.g., eye flutter, blinks, etc.) and suppress these fluctuations.

In some implementations, the gaze tracking is performed on two eyes of a same individual concurrently. A single neural network receives input images of event camera data for both of the eyes and determines gaze characteristics for the eyes collectively. In some implementations, one or more event cameras capture one or more images of portion of the face that includes both eyes. In implementations in which images of both eyes are captured or derived, the network could determine or produce output useful in determining a convergence point of gaze directions from the two eyes. The network could additionally or alternatively be trained to account for extraordinary circumstances such as optical axes that do not align.

In some implementations, an ensemble of multiple networks is used. By combining the results of multiple neural networks (convolutional, recurrent, and/or other types), variance in the output can be reduced. Each neural network can be trained with different hyper-parameters (learning rate, batch size, architecture, etc.) and/or different datasets (for example, using random sub-sampling).

In some implementations, post-processing of gaze characteristic is employed. Noise in the tracked points can be reduced using filtering and prediction methods, for example, using a Kalman filter. These methods can also be used for interpolation/extrapolation of the gaze characteristic over time. For example, the methods can be used if the state of the gaze characteristic is required at a timestamp different from the recorded states.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing,""calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node"are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an,"and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises"

and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination"or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause an electronic device to perform operations comprising:
receiving a stream of pixel events output by an event camera, the event camera comprising a plurality of pixel sensors positioned to receive light from a surface of an eye, each respective pixel event generated in response to a respective pixel sensor detecting a change in light intensity of the light at a respective event camera pixel that exceeds a comparator threshold;
generating a first input from the stream of pixel events;
generating an initial pupil characteristic based on inputting the first input to a first neural network;
determining a second input comprising a subset of the first input based on the initial pupil characteristic;
generating a correction of the pupil characteristic based on inputting the second input to a second neural network; and
determining a gaze characteristic by adjusting the initial pupil characteristic using the correction.

2. The system of claim 1, wherein the initial gaze characteristic is an initial pupil center.

3. The system of claim 1, wherein generating the first input from the stream of pixel events comprises deriving an image from the stream of pixel events.

4. The system of claim 3, wherein generating the first input comprises generating a lower resolution image from the image.

5. The system of claim 3, wherein deriving the image comprises accumulating pixel events of the stream of pixel events for multiple event camera pixels.

6. The system of claim 3, wherein the subset of the first input comprises a portion of the image.

7. The system of claim 6, wherein the subset of the first input comprises a small input image comprising the portion of the image centered around a location of the initial gaze characteristic, wherein the initial gaze characteristic is an initial pupil center.

8. The system of claim 6, wherein the portion of the image and the image have a same resolution and the portion of the image has fewer pixels than the image.

9. A non-transitory computer-readable storage medium, storing program instructions executable by one or more processors to perform operations comprising:
receiving a stream of pixel events output by an event camera, the event camera comprising a plurality of pixel sensors positioned to receive light from a surface of an eye, each respective pixel event generated in response to a respective pixel sensor detecting a change in light intensity of the light at a respective event camera pixel that exceeds a comparator threshold;
generating a first input from the stream of pixel events;
generating an initial pupil characteristic based on inputting the first input to a first neural network;
determining a second input comprising a subset of the first input based on the initial pupil characteristic;
generating a correction of the pupil characteristic based on inputting the second input to a second neural network; and
determining a gaze characteristic by adjusting the initial pupil characteristic using the correction.

10. The non-transitory computer-readable storage medium of claim 9, wherein:
generating the first input from the stream of pixel events comprises deriving an image by accumulating pixel events of the stream of pixel events for multiple event camera pixels;
the subset of the first input is a portion of less than all of the image centered around a location of the initial gaze characteristic; and
the initial gaze characteristic is an initial pupil center.

11. A method of event camera-based gaze tracking, the method comprising:
at a device with one or more processors and a computer-readable storage medium:
receiving a stream of pixel events output by an event camera, the event camera comprising a plurality of pixel sensors positioned to receive light from a surface of an eye, each respective pixel event generated in response to a respective pixel sensor detecting a change in light intensity of the light at a respective event camera pixel that exceeds a comparator threshold;
generating a first input from the stream of pixel events;
generating an initial pupil characteristic based on inputting the first input to a first neural network;
determining a second input comprising a subset of the first input based on the initial pupil characteristic;
generating a correction of the pupil characteristic based on inputting the second input to a second neural network; and
determining a gaze characteristic by adjusting the initial pupil characteristic using the correction.

12. The method of claim 11, wherein the initial pupil characteristic is an initial pupil center.

13. The method of claim 11, wherein generating the first input from the stream of pixel events comprises deriving an image from the stream of pixel events.

14. The method of claim 13, wherein generating the first input comprises generating a lower resolution image from the image.

15. The method of claim 13, wherein deriving the image comprises accumulating pixel events of the stream of pixel events for multiple event camera pixels.

16. The method of claim 13, wherein the subset of the first input comprises a portion of the image.

17. The method of claim 16, wherein the subset of the first input is the portion of the image centered around a location of the initial gaze characteristic, wherein the initial gaze characteristic is an initial pupil center.

18. The method of claim 16, wherein the portion of the image and the image have a same resolution and the portion of the image has fewer pixels than the image.

19. The method of claim 11, wherein the first neural network is a recurrent neural network.

20. The method of claim 11 further comprising identifying an item displayed on a display based on the gaze characteristic.

* * * * *